United States Patent
Hoeben et al.

(10) Patent No.: US 8,004,420 B2
(45) Date of Patent: Aug. 23, 2011

(54) SECURITY LIGHTING SYSTEM AND METHOD, AND CONTROL UNIT THEREFORE

(75) Inventors: Wilhelmus Frederik Laurens Maria Hoeben, Eindhoven (NL); Ronald Edwin Lavooi, Weert (NL); Petrus Johannes Mathijs Van Der Burgt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 508 days.

(21) Appl. No.: 11/916,295

(22) PCT Filed: Jun. 1, 2006

(86) PCT No.: PCT/IB2006/051760
§ 371 (c)(1),
(2), (4) Date: Dec. 3, 2007

(87) PCT Pub. No.: WO2006/131860
PCT Pub. Date: Dec. 14, 2006

(65) Prior Publication Data
US 2008/0198009 A1     Aug. 21, 2008

(30) Foreign Application Priority Data
Jun. 6, 2005   (EP) ..................... 05104889

(51) Int. Cl.
*G08B 5/00*       (2006.01)
*G08B 21/00*      (2006.01)

(52) U.S. Cl. ............. 340/815.4; 340/815.45; 340/332; 340/686.6; 340/541; 340/331; 119/174; 119/905; 119/908

(58) Field of Classification Search ................ None
See application file for complete search history.

(56) References Cited

U.S. PATENT DOCUMENTS

| | | | |
|---|---|---|---|
| 5,760,686 A * | 6/1998 | Toman | 340/540 |
| 5,969,593 A | 10/1999 | Will | |
| 6,508,204 B1 * | 1/2003 | Matheson et al. | 119/713 |
| 6,819,240 B2 * | 11/2004 | Iwasawa et al. | 340/541 |
| 2006/0028328 A1 * | 2/2006 | Cresse | 340/435 |

FOREIGN PATENT DOCUMENTS

| | | |
|---|---|---|
| DE | 3246906 A1 | 6/1984 |
| GB | 2184277 A | 6/1987 |
| GB | 2326008 A | 12/1998 |
| JP | 01187757 A1 | 7/1989 |
| JP | 03067535 A1 | 3/1991 |
| JP | 2000125746 A1 | 5/2000 |
| JP | 2000224949 A1 | 8/2000 |
| JP | 2001143657 A1 | 5/2001 |
| JP | 2003284482 A1 | 10/2003 |
| JP | 2004008035 A1 | 1/2004 |
| WO | 0249427 A1 | 6/2002 |
| WO | 03098659 A2 | 11/2003 |

* cited by examiner

*Primary Examiner* — Julie Lieu

(57) ABSTRACT

A security lighting system and method are intended to dispel and/or affect unwanted humans or animals by providing lighting that varies with a suitable switching frequency, such as between 5 and 70 Hz. The lighting of a light source of the system may be varied by a control unit as to intensity, color, pattern etc., with a preferred switching frequency being between about 15 and 20 Hz for humans. A proximity detector may be provided to activate the system when an unwanted presence is detected. Such varying lighting causes feelings of physical and psychological discomfort, which have found to be effective in chasing away animals and dispelling or disorienting humans.

20 Claims, 1 Drawing Sheet

SECURITY LIGHTING SYSTEM AND METHOD, AND CONTROL UNIT THEREFORE

Figure 1:
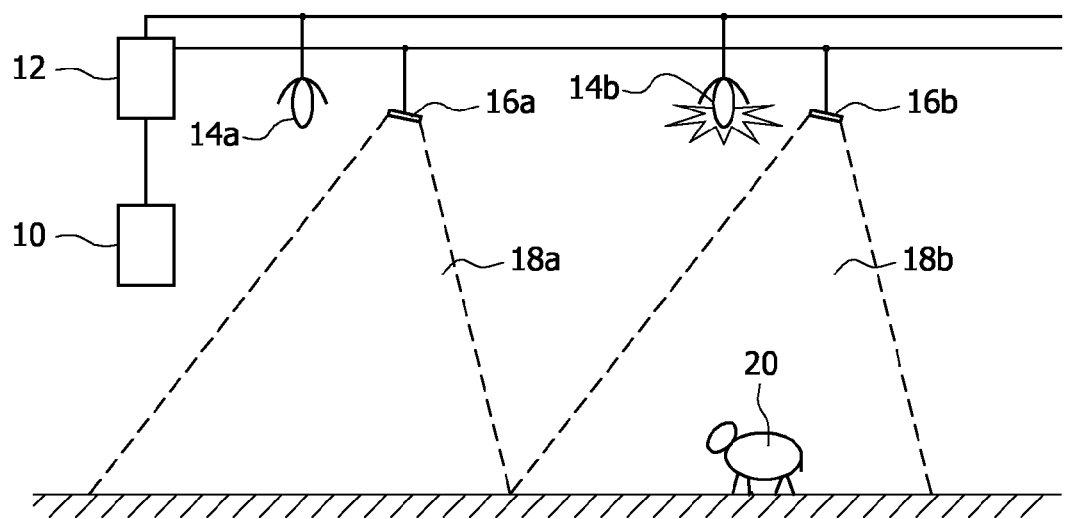

The present invention relates in general to affecting and/or dispelling humans and/or non-human animals by means of light.

For security and other reasons, it is often desirable to warn people to not come near to certain buildings, plants or other objects. Examples are industrial areas, such as chemical plants, oil wells and refineries, power generation and distribution sites, and broadcasting systems, also transport facilities such as runways, subways, railways, tunnels, harbors, and municipal facilities, such as sewers, drinking water catchments, and so on. Such reasons to warn may comprise prevention of criminal activities, such as theft, damage, narcotics distribution, rioting, vagrancy, and injury, or danger in general. Similar reasons may be given for chasing away animals, such as to prevent dangerous or even lethal animal-human interaction, but also including destruction of crops, or intrusion into villages and so on.

In a first aspect, the invention relates to a security lighting system, intended and arranged for affecting and/or dispelling humans and/or non-human animals, comprising at least one light source able to emit stimuli inducing light, an electrical connection for connecting the light source to an electrical power source and a control unit. Herein, the expression "stimuli inducing light" relates to infrared, visible or ultraviolet radiation that is able to induce physiological stimuli in humans and/or non-human animals, causing their behavior to be influenced.

Generally known is a burglar alert lamp, giving off (slow) flashes, as a warning that the burglary has been detected, and to chase away the burglar. Furthermore, from document U.S. Pat. No. 5,969,593 there is known a vehicle-mounted animal warning system, that gives off a number of ultraviolet or infrared flashes, in combination with shotgun sounds, in order to chase away the animals.

None of the known documents provide information on effectiveness of such flashes.

It is an object of the invention to provide a security lighting system of the kind mentioned above, with an improved effect as to affect and/or dispel.

This object is achieved by means of the security lighting system that includes a control unit which is able to vary at least one property of light emitted by the light source with a switching frequency of between 5 and 75 Hz.

The inventors have found that variations in the lighting with such frequencies are particularly useful in deterring humans and/or animals. In particular, it was found that such variations directly induced negative psychological and physiological effects such as feelings of nausea, disorientation or worse, in tested persons. In general, the lighting was found to be very unpleasant, and a cause to leave the place thus lighted, or at least to be strongly distracted or disoriented. This feeling was much stronger than simply knowing to be detected, such as with a slowly flashing burglar alarm. The general expression for all these unpleasant feelings as used in the context of the present invention is affecting or dispelling.

The mechanism is as yet unknown but may relate to a phenomenon known as photosensitive epilepsy, in which epileptic symptoms may be brought about by flickering light or patterns. It is believed that every person has his own sensitivity threshold for photosensitive epilepsy, and thus also for definitely being affected by the lighting of the present invention. Hence, 100% efficacy may not always be provided with a certain setting of the lighting. Nevertheless, the effect of the lighting is improved with the system, and lighting, according to the present invention. Furthermore, considering possible negative effects of photosensitive epilepsy, its induction within the context of society-impacting (e.g. terrorist) activities may provide an effective tool.

Note furthermore that the above discussion relates mainly to effects on humans. In order to dispel non-human animals, it may be desirable to set the switching frequency in accordance with the type of animal to be affected or dispelled, because it may be that the animal has a different sensitivity. For example, it is believed that birds are more sensitive to somewhat higher frequencies, of up to and around 75 Hz, where humans are only slightly sensitive. In an advantageous embodiment, the switching frequency is selected such that the unpleasant feelings for humans are relatively mild, while effective for a desired non-human animal, such as birds, predators or (other) large animals such as elephants. In particular, frequencies of at least 50 Hz, and up to about 75 Hz are deemed to cause only a weak response in most humans, while affecting birds etc. rather strongly.

In a special embodiment, the property of the light comprises the intensity. This property has a very direct effect on most humans and animals, and has proved to be very effective. The property may comprise glare, contrast, patterns etc.

In a special embodiment of the security lighting system, intended and arranged for affecting and/or dispelling humans, the switching frequency is between 5 and 35 Hz, preferably between 15 and 20 Hz. It has been found that frequencies of between about 5 and about 35 Hz are rather effective in humans, with an optimum between about 15 and 20 Hz. Lower or higher frequencies may still give results in a certain number of people, but the indicated switching frequency ranges provide higher, and optimum incidence, respectively, of the desired effects.

In an advantageous embodiment, the switching frequency is adjustable. With an adjustable switching frequency, it is possible to set the system to a certain type of human or animal to be dispelled or affected. Furthermore, it is possible to select a switching frequency with optimum experimental results, as determined in practice, such as for a specific animal. Adjustment of the switching frequency may be brought about manually, by an operator, or automatically by the control unit, for example as a switching frequency sweep, and the control unit may comprise suitable sweep circuitry. Such a switching frequency sweep ensures that humans or animals have more difficulty in adapting to the lighting. Preferably, the switching frequency is randomly variable in time, for further improved dispelling efficacy. Thereto, the control unit may comprise a random generator, such as a noise generator. Note that it is not necessary that the switching frequency is always in the range between 5 and about 75 Hz. It need only lie in that range for a substantial amount of time, say at least during 50% of the time the system is actively varying the lighting. It is of course possible for the frequency to always lie in the range between 5 and 75 Hz.

The system according to the invention may, in certain embodiments, be thought of as providing "flashes". The flashes may be flashes in a strict sense, in that there are periods of emitting light, alternated with completely dark periods. However, this is not necessary, and it is sufficient if the level of the emitted light intensity varies appreciably with the indicated switching frequency. In a particular embodiment, the control unit is designed to vary the intensity of the emitted light between at least two levels having an intensity ratio of at least 1:5. This variation of the intensity level may be brought about by varying the power between corresponding levels. In particular, the power ratio is at least 1:10, i.e. between periods of relatively low intensity and periods of relatively high intensity. Note however, that ratios of 1:1.2 and higher are believed to be functional also, with higher ratios deemed more effective. Note that it is the effective emitted (optical) power that is relevant, since this directly relates to the intensity. For example, an incandescent lamp that is driven with ordinary alternating current has a supplied power that varies smoothly between zero and a maximum power (and hence an infinite ratio), with double mains frequency. However, due to the rather long cooling time of the filament, the emitted intensity ratio is much, much less, in fact so much so that, without adaptations, an incandescent lamp is deemed almost useless by itself for the purpose of the present invention. Alternatively, independent of the supplied power, the emitted (optical) power may be influenced by an attenuator, etc. In this way, it is even possible to obtain a virtually infinite ratio between the high and the low emitted power.

For similar reasons, and with corresponding advantage, the emitted intensity variations between high and low intensity are preferably substantially not smooth, i.e. not sine-like, but rather step-like, although even smooth variations may give rise to unpleasant effects, in particular if they are strong enough, such as at least in a 1:1.2 ratio.

In a special embodiment, the property comprises a color spectrum of light of the light source. In other words, the color spectrum is adjustable, in particular such that the color spectrum in the high intensity situation differs from the low intensity situation. It is believed that changing color impressions caused by such change in the color spectrum enhance the unpleasant feelings of disorientation, discomfort etc. Such changes may e.g. be brought about by color filters. Thereto, the control unit, or the system in general, may comprise one or more color filters, that may be positioned with respect to the light source to have the desired effect. Alternatively, use may be made of the properties of the one or more light sources. For example, when changing the electrical power supplied to a high-pressure sodium lamp, the ratio of power taken up by the sodium vapor and the power taken up by the mercury vapor may change. In that case, the color spectrum will also change. In particular, a "blue flash" may occur, when the ratio of power in the mercury discharge to power in the sodium discharge increases. This blue flash has a relatively higher share of blue light and much less red light, which may be clearly visible.

The color spectrum of the emitted light is not particularly limited. In fact, it may comprise wavelengths that are invisible for humans, such as ultraviolet and/or infrared wavelengths, which are visible to certain kinds of animals. Advantageously, limiting the emitted light to such invisible wavelengths offers the possibility of chasing away animals without interfering with human activity.

Although the color of the emitted light is not particularly limited, in a special embodiment at least about 5% of the light emitted by the light source has a red color, i.e. has a wavelength in the red region. It has been found that in particular rapidly changing red light has a strong effect on humans, a higher percentage being more effective. In particular, a very strong effect is obtained when substantially all visible light, i.e. at least 50% of the visible light, has a wavelength in the red region.

Alternatively, it may be advantageous if a substantial amount of the emitted visible light, i.e. at least 5%, preferably at least 25%, and most preferably at least 50%, has a wavelength between about 450 and 600 nm, more advantageously between about 450 and 550 nm. At these wavelengths, the retina sensitivity for light is a maximum. In particular, the retinal rods, that are mostly active at low light levels, have their highest sensitivity between about 450 and 550 nm, i.e. blue-green. By providing flashes with a (predominant) color in the blue-green, but with an intensity that is sufficient to activate the retinal cones, the visual perception and the corresponding stimuli rapidly change. This is believed to enhance the unpleasant feelings in humans. Another advantage of providing a relatively high percentage of the light with a wavelength at maximum eye sensitivity is that this generally requires the least amount of power for the light source, and is thus often the most energy efficient.

A special embodiment further comprises a proximity detector coupled to the control unit, such that the control unit starts to vary the property of the light with the switching frequency when the proximity detector detects a non-desired presence. In other words, the light source is only made to vary its light emission when a need thereto is detected by the proximity detector. Varying the property may comprise e.g. varying the intensity and/or the color spectrum, as mentioned above. This may be brought about by the control unit e.g. by varying the power supplied to the light source. Alternatively or additionally, in case of a gas discharge lamp, varying the duty cycle of the lamp current by the control unit may also cause a color shift, such as is described in WO03/098659, in the name of the same applicant. Furthermore, variations of the properties may be brought about by other means, such as movable color filters or other attenuators that are controlled by the control unit.

Note that the control unit and/or the proximity detector may be set such that the varying of the light emission continues during a period of time after the detector stopped detecting an undesired presence. Such period of time may be predetermined, such as between 10 and 500 seconds.

For the purpose of the present invention, a proximity detector is deemed to comprise a motion detector, thermal (infrared) detectors and other detectors capable of detecting an undesired presence. Optionally, the proximity detector, or the control unit, may be provided with image recognition software, to prevent false alarms. Optionally, the proximity detector or the control unit may be adjustable to the kind of human or non-human animal to be affected and/or dispelled, such as based on size and general shape.

Note that it is not necessary to provide a proximity detector. For example, protecting an object, a room or space etc., it may suffice to simply activate the present system in a continuous mode. Alternatively, in a system for specific action, it may suffice when the system is activatable by an operator, such as in a system according to the invention, for pacifying or dispersing mobs or crowds, to be discussed below.

However, providing a proximity detector is deemed to offer a number of advantageous possibilities. First of all, activating the system only when an undesired presence is detected not only increases the surprising and unpleasant effect for the detected being, but is also very energy efficient. Furthermore, a flickering, or otherwise varying lighting, especially if this suddenly starts, effectively attracts attention, which itself has a dispelling effect on in particular humans.

Alternatively, in a special embodiment of the system according to the invention, the control unit is able to supply the light source with a substantially continuous power for burning at a non-zero intensity level. This relates in particular to cases when the proximity detector does not detect a non-desired presence. However, even then the control unit may overrule the signal of the proximity detector when desired, e.g. for inspection purposes. Thereto, the system may comprise a switching means that switches the system to a mode in which the control unit supplies the light source with a substantially continuous power for burning at a non-zero intensity level, preferably a nominal intensity level. E.g., the system comprises a remote control, an electronically activatable switch, et cetera. Such control or switch may be embodied as a badge or the like, to be used by e.g. law enforcement officers, operators, mechanics and other people not to be dispelled.

Providing such substantially continuous lighting offers the advantage of ordinary lighting of an object, a space etc. This offers the possibility of e.g. visual inspection and increased security etc., but also of desirable ornamental lighting. Possible objects to be protected in this way may be for example prisons, power plants, military or research facilities, museums and so on, where normally no person is allowed access to outside the designated gates. Also, the possibility of providing ordinary, i.e. continuous, lighting with the same lighting system offers the additional advantage that, after an intrusion has been detected and the intruder has been warned, dispelled or otherwise affected, the area may be searched under optimum lighting, without affecting the search party.

As an alternative or addition, the control unit may comprise an attenuator that is able to attenuate the emitted light with a desired switching frequency. In this way, it is possible to use any type of lighting, even the incandescent lamps as discussed above, and still obtain the desired results of affecting humans and animals. Such attenuator may comprise a mechanical, electro-optical etc. shutter or the like. Especially in combination with varying the power supplied to the light source, it is possible to achieve additional randomizing effects, increasing effectiveness.

In a special embodiment of the system according to the invention, the light source comprises a gas discharge lamp. Gas discharge lamps often offer powerful lighting, the intensity of which may be switched rather quickly between high intensity and low intensity.

In a particular embodiment, the gas discharge lamp comprises a high-pressure mercury vapor lamp, optionally with at least one added metal halide. High-pressure mercury vapor lamps offer a high intensity in a robust design. Metal halides may optionally be added to increase the intensity in desired wavelength ranges. For example, lithium halides may be added in order to increase the intensity in the red wavelength region, which is substantially absent in a pure mercury discharge.

Note that the expression "high-pressure" is deemed to include all non-low pressure mercury vapor discharge lamps, such as medium pressure, high-pressure or super high-pressure mercury vapor discharge lamps. Low pressure mercury vapor discharge lamps ("tube lights") seem less suitable for the purpose of the invention, because of the relatively low light intensity levels, the slowness of many luminescent materials etc. However, in certain cases, such as lighting inside buildings, the achievable intensity may be sufficient for the purpose of affecting intruders. Furthermore, it has been found that it is not only the intensity that plays a role. The lighting surface area also seems important, in that a larger area that shows a varying lighting has more effect than a smaller area. Since low pressure lamps may effectively light large areas, such as large screens, they are suitable for embodiments having a large surface area. They are even more suited to provide patterned lighting of such large areas, such as screens.

In another particular embodiment, the light source comprises a high-pressure sodium lamp, optionally with at least one added metal halide. A sodium lamp has an even higher efficiency than a mercury vapor lamp, emits predominantly in a wavelength region for which the eye is most sensitive, furthermore also emits in the red region, and is also of a robust design. Furthermore, sodium lamps offer a much smaller environmental hazard, due to the (near) absence of mercury. Sodium lamps are much used for general lighting of large objects, not only for energy efficiency but also because they provide a pleasant "warm" golden light. Note that this pleasantness is rather different when the properties of the lighting are varied according to the invention. In addition, when switching such a sodium lamp between a high intensity and a low intensity, the color of the emitted light is shifted, adding to the unpleasantness. This color shift is not only due to the different properties of the plasma in the different situations, but is deemed enhanced due to an increased contribution of mercury or other support gas, which emits with a spectrum different from the sodium.

Alternatively or additionally, the light source comprises a LED. LEDs often advantages in that they may be very easily switched at any desirable and suitable switching frequency, without any substantial effect on their life span. Furthermore, they come in many different colors, such as desirable red colors, or may even emit different colors depending on supply voltage or current. Furthermore, they are very small and compact. They may thus be built into many different devices or apparatus. It is also possible to use simple optics to focus the light to a concentrated high intensity beam that may be effective on a relatively large distance, such as several meters, even with a relatively small total emitted optical power.

An alternative embodiment comprises a laser light source. Lasers may offer very high intensities, at many different and easily varied frequencies, in many colors. If required, the system comprises an optical system for lowering the intensity of the emitted laser beam to an intensity that is not dangerous for the retina or other body parts of an intruder. Such optical system may comprise a beam expander, which still allows use of the lighting of the system at a large distance. Alternatively, a lens, a diffuser etc. may be used.

A special embodiment comprises a plurality of light sources. Providing a plurality of light sources offers many advantages. For example, it is easier to provide a higher intensity or more lighted and secured area. It is also possible to provide more possibilities of varying the lighting. For example, the variation may be in unison, providing the highest possible differences in e.g. intensity. Alternatively, different patterns of variation may be provided, such as "running" lighting, randomly varying lighting, both as to position and switching frequency of the lighting of each light source, and so on. All such variations may add to the effectiveness of the system.

The system according to the invention may comprise a plurality of one particular type of light sources, which facilitates control of the different light sources. Alternatively, it is also possible to provide different types of light sources, such as sodium lamps and LEDs. In particular it is also possible to provide e.g. LED assemblies, in which more than one LED is comprised. Such LED assembly may comprise one or more LED types. Providing one type may simply increase the total light output, while providing different types of LED in one assembly increases the number of possibilities as to varying the lighting, e.g. by changing color of the emitted light via activating different LEDs.

To achieve at least part of the possibilities outlined above, it is contemplated to provide a system according to the invention, wherein at least one of the plurality of light sources is controlled independently of the other light sources, for example for lighting different light sources at a time, in order to provide varying patterns. Alternatively, it is of course possible that all light sources are controlled in mutual dependency, such as at the same time. This allows a very simple control unit.

In a special embodiment, the system comprises a power source for the light source. Herein, as in all of the following, the option of more light sources is deemed included. By providing a power source for the light source, the system may be a stand-alone system, which may be useful for remote areas, or for mobile use, etc. A convenient power source may be a battery, a generator and so on.

The invention also relates to a control unit for use in a security lighting system according to the invention, comprising an electrical connection for an electrical power source, an electrical feed connection for at least one light source, and a circuit arrangement that is able to vary a property of the light emitted by the light source with a switching frequency of between 5 and 70 Hz. Such control unit specifically offers the possibility of providing a dispelling and/or affecting function to existing lighting equipment.

A control unit of the kind mentioned above may for example comprise circuitry for varying the power supplied to the light source, e.g. in a suitable ratio of at least 1:1.2, more suitably at least 1:5, preferably at least 1:5. Note that in cases such as gas discharge lamps, it is desirable to provide suitable ratios such that in the lowest power level the lamp does not extinguish. This may be influenced by various factors known to the skilled person and dependent of the specific type of lamp.

Also, it is possible to provide circuitry to activate different light sources, in varying patterns and/or with varying frequencies or intensity levels, etc. In short, many of the above mentioned embodiments may also be embodied in a control unit. They will not be all repeated here for brevity's sake, but will be understood to be part of the invention.

In particular, however, the control unit further comprises a proximity detector, that is able to start a variation operation of the control unit on detecting an undesired presence. Herein, a variation operation is intended to mean the varying of the operation of the light source. As already mentioned above, inclusion of a proximity detector greatly enhances the possibilities of the total system, and can hence also offer these possibilities in existing lighting systems.

The invention also relates to the use of a system according to the invention as mentioned and described above. As a general remark, it is stressed here that in the known lighting industry, one of the most important research aims is to minimize flickering and other variations of light sources, because this is unpleasant for the consumer. It is thus a fundamental new insight that when this flickering, or other variations, are suitably stressed, it may be put to good use.

In particular, the invention also relates to a method of affecting and/or dispelling humans and/or non-human animals, comprising providing a light source able to emit stimuli inducing light, and varying a property of light emitted by a light source, with a switching frequency of between 5 and 70 Hz, preferably between 5 and 35 Hz, most preferably between 15 and 20 Hz. Note that this method is deemed to comprise the situation that "in rest" the light source does not emit light at all, but is only activated when desired.

Again, substantially all embodiments described in connection with the system according to the invention may be similarly embodied in the method according to the invention, and will hence not all be described, but are deemed to be part of this invention.

However, in particular, the property comprises the intensity of the emitted light, preferably with an intensity ratio of at least 1:1.2, more preferably of at least 1:5.

Advantageously, the switching frequency is varied, preferably randomly varied in time.

Alternatively or additionally, the color spectrum of the light is varied.

Preferably, use is made of a system according to the invention.

Figure 2:
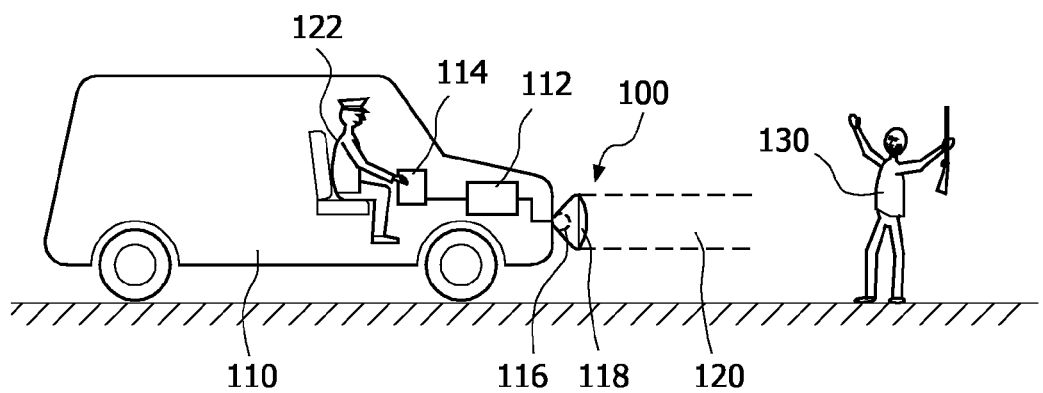

The invention as disclosed above may be better understood after reading a description of certain specific embodiments, with reference to the drawings, in which FIG. 1 very diagrammatically shows a security lighting system according to the present invention; and FIG. 2 diagrammatically shows another embodiment of the security lighting system according to the invention.

In FIG. 1, the security lighting system comprises a power source 10, a control unit 12, a plurality of light sources 14a, 14b, and a plurality of proximity detectors 16a, 16b. The proximity detectors have respective fields of view 18a, 18b. An intruding animal is diagrammatically denoted by reference numeral 20.

The power source 10 may also be a power connection to a main or other external power source. In other words, an actual power source is optional. In the embodiment shown, the power source is a battery. The power source 10 is connected to a control unit 12, such as a computer or other suitable circuitry.

A plurality of light sources 14a, 14b, . . . is connected to the power source 10 via the control unit 12. The number of light sources 14a, 14b . . . as depicted here is two, but may also be any other number, such as one or three or more. In the embodiment depicted here, the light sources comprise gas discharge lamps, such as high-pressure sodium lamps, for example Philips SON lamps. These lamps are well suited for lighting, and may be operated both at high and low power levels. In other words, these lamps are well suited for flash operation.

Also connected to control unit 12 are proximity detectors 16a, 16b, . . . . These detectors may detect the presence and/or movement of an undesired object such as an intruding animal 20. Examples of undesirably intruding animals are lions, tigers, foxes, snakes, etc. The proximity detectors 16a, 16b, should of course be suited to detect the presence of such animals. The embodiment shown here shows one proximity detector for every light source. It is, however, possible to provide viewer or more proximity detectors, such as one for two or more lamps, or two or more for each lamp, etc.

Each proximity detector 16a, 16b has its own "field of view" 18a, 18b respectively. In practice, substantially all of the relevant area should be covered by the added fields of view, or at least provide a suitable sample thereof, such as a grid.

In FIG. 1, an undesired animal 20 is present in the field of view 18b of the second proximity detector 16b. Proximity detector 16b gives a signal to control unit 12, which thereupon operates such that power source 10 provides intermittent power to light source 14b, which will start to flash. According to the invention, the power supplied to the light source 14b will vary with a switching frequency which is effective in dispelling the undesired animal 20, such as with a switching frequency between 5 and 70 Hz.

To increase efficacy, it is possible to adapt the control unit 12 such that more than just light source 14b will start to flash, such as substantially all light sources 14a, 14b, . . . . Alternatively, the switching frequency with which the light sources will start to flash varies from light source to light source. Alternatively, or additionally, other properties of the emitted light of the light sources may be varied by the control unit 12, such as the color e.g. in the case of the light sources 14a, 14b being LED assemblies.

FIG. 2 diagrammatically shows another embodiment of the security lighting system according to the invention.

The system is denoted generally by reference numeral 100. The total system 100 comprises a vehicle 110, with a power source 112 and a control unit 114, as well as a light source 116, providing a beam 120 via optical system 118. An operator is generally denoted by 122, while a rioter is generally denoted by 130.

The system 100 is suitable for use by an operating person 122, such as a law enforcement officer, and may hence be provided without proximity detector.

The power source 112 may be a car battery, or a separate energy source, which is able to supply power to the light source 116 under the control of control unit 114.

The light source 116 may be any suitable light source, such as a gas discharge lamp, a high power LED assembly or a laser.

The optical system 118 may serve various purposes. In the case of the light source 116 being a gas discharge lamp, or a LED assembly, the optical system 118 may be a collecting lens, focusing the emitted light into a beam 120. Such a beam may be more effective at larger distances. Alternatively, or additionally, in the case the light source 116 comprises a laser, the optical system 118 may comprise a beam expander, in order to lower the maximum intensity/power of the beam 120 to levels which will not cause physical injury, e.g. to the retina, but which will cause feelings of nausea, disorientation, and in general will affect a rioter 130.

Thereto, with a suitable protocol, the operator 122 may activate the light source 116 via the control unit 114 to provide a varying lighting in the beam 120, e.g. with an intensity that varies with a switching frequency of between about 15 and 20 Hz. Such frequencies are found to be very disturbing to humans. A possible use may be to pacify or dispel persons, such as a rioter 130.

While various embodiments have been depicted and described, these are deemed to be only exemplary, and should not be construed as limiting the invention. Rather, the scope of the invention is as defined by the appended claims.

The invention claimed is:

1. A security lighting system intended and arranged for affecting and/or dispelling humans and/or non-human animals, comprising:
   at least one light source configured to emit stimuli inducing light,
   an electrical connection for connecting the light source to an electrical power source, and
   a control unit configured to automatically vary at least one property of light emitted by the light source with a first switching frequency of between 5 and 20 Hz when a human is detected and with a second switching frequency when a non-human animal is detected, the second switching frequency being higher than the first switching frequency.

2. The security lighting system according to claim 1, wherein the property is an intensity of the light.

3. The security lighting according to claim 1, wherein the switching frequency is between 15 and 20 Hz.

4. The security lighting system according to claim 1, wherein the switching frequency is adjustable and is randomly variable in time.

5. The security lighting system according to claim 1, wherein an intensity ratio of the emitted light between low intensity and high intensity is at least 1:5.

6. The security lighting system according to claim 1, wherein a color spectrum of the light of the light source is adjustable.

7. The security lighting system according to claim 1, wherein at least about 5% of the light emitted by the light source has a red color.

8. The security lighting system according to claim 1, further comprising a proximity detector coupled to the control unit, such that the control unit starts to vary the property of the light of the light source with the switching frequency when the proximity detector detects a non-desired presence.

9. The security lighting system of claim 8, wherein the control unit is configured to supply the light source with a substantially continuous power for burning at a non-zero intensity level.

10. The security lighting system according to claim 1, wherein the control unit comprises an attenuator that is configured to attenuate the emitted light with a desired switching frequency.

11. The security lighting system according to claim 1, wherein the light source comprises a gas discharge lamp.

12. The security lighting system according to claim 11, wherein the gas discharge lamp comprises a high-pressure mercury vapor lamp, optionally with at least one added metal halide.

13. The security lighting system according to claim 11, wherein the light source comprises a high-pressure sodium lamp, optionally with at least one added metal halide.

14. The security lighting system according to claim 11, wherein the light source comprises a LED.

15. The security lighting system according to claim comprising a plurality of light sources.

16. The security lighting system according to claim 15, wherein at least one of the plurality of light sources is controlled independently of the other light sources.

17. A method of affecting and/or dispelling humans and/or non-human animals, comprising providing a light source configured to emit stimuli inducing light, and varying a property of light emitted by the light source with a switching frequency of between 5 and 20 Hz when a human is detected and with a second switching frequency when a non-human animal is detected, the second switching frequency being higher than the first switching frequency.

18. The method of claim 17, wherein the property comprises the intensity of the emitted light.

19. The method of claim 17, wherein the switching frequency is varied randomly varied in time.

20. The method of claim 17, wherein the color spectrum of the light is varied.

* * * * *